United States Patent [19]
Seibel et al.

[11] Patent Number: 5,965,995
[45] Date of Patent: Oct. 12, 1999

[54] TRANSIENT INDUCTANCE TUNER FOR MOTOR CONTROL

[75] Inventors: Brian J. Seibel, Grafton; Russel J. Kerkman, Milwaukee; Timothy M. Rowan, Wauwatosa, all of Wis.

[73] Assignee: Allen-Bradley Company, LLC, Milwaukee, Wis.

[21] Appl. No.: 08/933,214

[22] Filed: Sep. 18, 1997

[51] Int. Cl.⁶ .............................. H02P 5/28; H02P 7/00
[52] U.S. Cl. .................... 318/805; 318/807; 318/432; 318/434; 318/801
[58] Field of Search .................. 318/609, 800–832, 318/432, 434

[56] References Cited

U.S. PATENT DOCUMENTS

| | | | |
|---|---|---|---|
| 4,245,181 | 1/1981 | Plunkett | 318/805 |
| 4,258,302 | 3/1981 | Plunkett | 318/723 |
| 4,418,308 | 11/1983 | Bose | 318/803 |
| 4,453,116 | 6/1984 | Bose | 318/727 |
| 4,539,514 | 9/1985 | Espelage et al. | 318/778 |
| 4,751,447 | 6/1988 | Okachi | 318/772 |
| 4,984,147 | 1/1991 | Araki | 363/84 |
| 5,278,486 | 1/1994 | Kim | 318/811 |
| 5,321,343 | 6/1994 | Kane, Jr. et al. | 318/254 |
| 5,355,070 | 10/1994 | Cocconi | 318/798 |
| 5,479,081 | 12/1995 | Seibel et al. | 318/805 |
| 5,502,360 | 3/1996 | Kerkman et al. | 318/805 |
| 5,537,308 | 7/1996 | Gritter | 33/95 |
| 5,598,081 | 1/1997 | Okamura et al. | 318/801 |
| 5,619,114 | 4/1997 | Blasko | 318/812 |

*Primary Examiner*—Paul Ip
*Attorney, Agent, or Firm*—Michael A. Jaskolski; John M. Miller; John J. Horn

[57] ABSTRACT

A method and apparatus used with a field oriented motor controller for providing corrected transient inductance estimates during normal motor operation. The invention monitors q-axis feedback and command voltages and, based on an error therebetween, modifies a transient inductance estimate to compensate for the error and force the feedback voltage to equal the command voltage thereby facilitating field oriented control. The invention can be used either during a commissioning procedure to provide an inductance correction table for use during normal motor operation or can be used during normal motor operation to tune the inductance estimate.

24 Claims, 5 Drawing Sheets

TRANSIENT INDUCTANCE TUNER FOR MOTOR CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers for controlling the speed of high performance electrical induction motors and, more particularly, the invention relates to a method and apparatus for determining a motor's transient inductance which is used during motor control.

Induction Motors

Induction motors generally include a rotor mounted inside a stator for rotation about a rotation axis. A common rotor design includes a "squirrel cage winding" in which axial conductive bars are connected at either end by shorting rings to form a generally cylindrical structure. The stator is formed by a plurality of windings which surround the rotor and are typically arranged in three separate phases. Time varying voltage is applied across the stator windings which generate an electromotive force (emf) and an associated stator magnetic field which rotates around the stator at a stator field frequency primarily within the space defined by the rotor. As the stator field rotates about the rotor, relative motion between the stator field flux and the rotor bars induces voltages in the rotor.

The voltages induced in the rotor cause rotor bar currents which in turn generate a rotor magnetic field. The stator and rotor fields are stationary with respect to each other but are separated by a changeable rotor angle α. The two fields interact to produce torque which causes rotor rotation.

Ideally, rotor speed should be controllable by simply controlling the stator field frequency. For example, because the rotor follows the stator field, by increasing stator field frequency the rotor frequency should also increase. Unfortunately, while the general rule that rotor frequency can be controlled by controlling stator field frequency is accurate, the motor is non-linear which makes precise control extremely complex.

Field-Oriented Control of Induction Machines

Referring to FIG. 1, a rotating phasor 14 corresponding to the stator magneto motive force ("mmf") forms an angle α with respect to a phasor corresponding to rotor flux 18. Torque generated by the motor is proportional to the magnitudes of these phasors 14 and 18 but also is a function of angle α. Maximum torque is produced when phasors 14 and 18 are at right angles to each other (e.g., α=90°) whereas zero torque is produced if these phasors are aligned (e.g., α=0°). Phasor 14 may therefore be usefully decomposed into a torque producing component 15 perpendicular to phasor 18 and a flux component 17 parallel to phasor 18.

Mmf components 15 and 17 are proportional, respectively, to two stator currents $i_{qe}$, a torque producing current, and $i_{de}$, a flux producing current, which may be represented by orthogonal vectors in the rotating frame of reference (synchronous frame of reference) of the stator flux having slowly varying magnitudes. The subscript "e" is used to indicate that a particular quantity is in the rotating or synchronous frame of stator flux.

Accordingly, in induction motor control, in addition to controlling the stator voltage frequency (i.e. the rotational speed of phasor 13) and stator voltage amplitude, it is also advantageous to control the stator voltage phase relative to the stator winding current and hence division of stator winding current into $i_{qe}$ and $i_{de}$ components. Control strategies that attempt to independently control currents $i_{qe}$ and $i_{de}$ are generally termed field oriented control strategies ("FOC") and require knowledge about both $i_{de}$ and $i_{qe}$ magnitudes and an associated slip frequency.

One common way to control division of the d and q-axis currents $i_{de}$ and $i_{qe}$ is to employ a model reference adaptive controller (MRAC). An MRAC receives motor command signals and derives motor reference quantities based on the command signals. The reference quantities are compared to the actual motor feedback quantities to generate error signals. The error signals are used by an adaptive controller mechanism to alter controller gains and thereby eliminate the error and, in the case of FOC, maintain field orientation.

An MRAC requires an accurate model of the plant to be controlled. Therefore, to be accurate, the MRAC must be provided with certain characteristic motor parameters which can be used to define outputs corresponding to specific motor input command signals.

Generally, the production of any given set of currents $i_{qe}$ and $i_{de}$ requires that the stator be excited with voltages $V_{qe}$ and $V_{de}$ as follows:

$$V_{qe} = r_s i_{qe} + \omega_e \lambda_{de} \qquad \text{Eq. 1}$$

$$V_{de} = r_s i_{de} - \omega_e \lambda_{qe} \qquad \text{Eq. 2}$$

where, $V_{qe}, V_{de}$=terminal voltage components;

$r_s$=stator resistance;

$i_{qe}, i_{de}$=terminal current components;

$\omega_e$=electrical field frequency; and $\lambda_{de}, \lambda_{qe}$=stator flux linkages and where, $r_s i_{de}, r_s i_{qe}$=stator resistance voltage drops;

and $\omega_e \lambda_{de}, \omega_e \lambda_{qe}$=counter electromotive forces (EMFs). In addition, motor torque can be represented by the equation:

$$T_e = \frac{3}{2} * \frac{\text{Poles}}{2} * (i_{qe} * \lambda_{de} - i_{de} * \lambda_{qe}) \qquad \text{Eq. 3}$$

As well known in the FOC art:

$$\lambda_{de} = L_s i_{de} \qquad \text{Eq. 4}$$

and $$\lambda_{qe} = L_\sigma i_{qe} \qquad \text{Eq. 5}$$

where $L_s$ motor winding inductance and $L_\sigma$=transient inductance

Combining Equations 2 and 5:

$$V_{de} = r_s i_{de} - \omega_e L_\sigma i_{qe} \qquad \text{Eq. 6}$$

Clearly, based on Equation 6, one important characteristic motor parameter for model reference adaptive FOC is transient inductance $L_\sigma$. The industry has derived numerous tests which can be used to provide an inductance estimate $L_\sigma$ and has provided various control schemes which can be used to adjust motor control as a function of the estimate. One particularly useful test which provides an $L_\sigma$ estimate during a commissioning procedure prior to normal motor operation is described in U.S. patent application Ser. No. 08/402,288 which was filed on Mar. 10, 1995 which is entitled TRANSIENT INDUCTANCE IDENTIFIER FOR MOTOR CONTROL and which is incorporated herein by reference. Once the procedure described therein yields an inductance estimate, the estimate is used for motor control during normal operation.

Drive performance, including torque and flux control and field orientation generally depend upon the accuracy of the $L_\sigma$ estimate. For example, if estimate $L_\sigma$ is in error, flux $\lambda_{qe}$ is in error (see Equation 5) and voltage $V_{de}$ is in error (see Equation 2) and the motor torque Te is also in error (see Equation 3). For example, if estimate $L_\sigma$ is too large, according to Equation 5, flux $\lambda_{qe}$ will be too large. Flux $\lambda_{qe}$ is increased at the expense of flux $\lambda_{de}$. Thus, if flux $\lambda_{qe}$ is too large because estimate $L_\sigma$ is too large, then flux $\lambda_{de}$ will be too small and the q-axis stator voltage $V_{qe}$ will be too small (see Equation 1). For this reason, voltage $V_{qe}$ can be used as an indicator of transient inductance error. Here, where $V_{qe}$ is too small, the inductance estimate is too large and vice versa. These relationships can be illustrated by comparing motor operating quantities derived with a correct $L_\sigma$ value (FIG. 2) and an incorrect value (FIG. 3).

FIG. 2 shows the transient response of a current regulated induction motor drive operating under torque control with a correct $L_\sigma$ value. The motor is field oriented, torque Te is commanded without oscillation and very little error develops in the q-axis stator voltage $V_{qe}$ or rotor flux $\lambda_{qr}$.

FIG. 3, however, shows results derived using the same control system, but with an $L_\sigma$ estimate which is 85% of the motor's actual transient inductance. Errors appear in each of the torque Te, q-axis stator voltage $V_{qe}$ and q-axis rotor flux $\lambda_{qr}$. In addition, it takes a relatively long time for transients to decay.

As well known in the art, torque producing current $i_{qe}$ changes with load. Furthermore, inductance $L_\sigma$ is load dependant (see FIG. 5). For this reason, while the commissioning test described in the above referenced patent application provides a fairly accurate initial $L_\sigma$ estimate, during motor operation actual $L_\sigma$ can change appreciably thereby distorting field orientation. In some cases actual $L_\sigma$ can be greater than +/− 15% different than the estimate.

Referring to FIG. 4, the effect of an $L_\sigma$ error on q and d-axis reference voltages during a load step is illustrated. The AC motor used in this test was a 75 Hp, 460 V, 1783 rpm, 85 Arms machine. At 10 seconds a 1 p.u. torque step was applied with a DC dyne running as a velocity regulator at 1500 rpm. At the 10 second point initial oscillation in the voltages is due to L di/dt which is not compensated for in the model reference adaptive control.

Following the inductance transient, a low frequency oscillation at slip frequency occurs since field orientation is not achieved. Once steady state is reached, it is evident from the drop in q-axis voltage that field orientation is lost. If field orientation had been achieved the q-axis voltage should increase by $i_{qe}*r_s$ (see Equation 1).

Thus, it should be appreciated that even a small error in the $L_\sigma$ estimate causes controller error and the loss of FOC. Therefore, it would be advantageous to have a system which facilitates precise field oriented control despite changes in the actual transient inductance $L_\sigma$.

BRIEF SUMMARY OF THE INVENTION

The present invention includes a system for accurately determining load dependent transient inductance values in an electric motor during a commissioning procedure. The values are correlated with a load dependent command current and the correlated values are stored in an inductance table and used later during normal motor operation. During normal operation, the load dependent command current is monitored and a correlated inductance value is provided to facilitate FOC.

The invention includes an inductance identifier for use with a three phase field oriented motor controller which provides q-axis command and feedback voltage signals and an initial inductance estimate and uses an inductance value for motor control. The identifier includes a comparator for comparing the command and feedback voltage signals to derive an error signal and a calculator for mathematically combining the error signal and the initial inductance estimate to provide a correct inductance value for use by the controller.

Thus, one object of the invention is to provide a simple way to determine an accurate transient inductance value for a specific load. To this end, it has been recognized that q-axis voltage errors reflect inductance errors. Thus, by adjusting the inductance estimate until the q-axis voltage error is eliminated, an accurate inductance value for a specific load can be derived.

In one aspect the identifier operates during normal motor operation and further includes a switch which, when the error signal is essentially zero, maintains a constant correct value.

In yet another aspect the identifier operates during a commissioning procedure to identify the correct inductance value. There are a plurality of correct values, a different value for each of several different loads. The controller is capable of simulating different motor loads during the commissioning procedure by providing d and q-axis current command signals, the identifier includes a correlator for correlating correct values and the q-axis current command signal and a memory for storing the correct values as a function of the q-axis current command signal.

Thus, another object of the invention is to provide correct inductance values during a commissioning procedure prior to normal motor operation so that very little computing time is required during normal operation to identify the correct values. To this end the identifier further includes an inductance tuner which, during normal motor operation, receives the q-axis current command signal and generates a corrected value by correlating the q-axis current with a correct value in the memory.

The invention also includes a method for deriving a correct inductance value for use with a three phase field oriented motor controller which provides q-axis command and feedback voltage signals and an initial inductance estimate and uses an inductance value for motor control. The method includes the steps of comparing the command and feedback voltage signals to derive an error signal and mathematically combining the error signal and the initial inductance estimate to provide a correct value for use by the controller.

In one aspect the method operates during a commissioning procedure. There are a plurality of correct values, a separate value corresponding to each of a number of different loads. The controller is capable of simulating different motor loads during the commissioning procedure by providing d and q-axis current command signals and the method includes the steps of correlating correct values and the q-axis current command signal and storing each value as a function of the q-axis current command signal. The method further includes the step of, during normal motor operation, receiving the q-axis current command signal and generating a correct value by correlating the q-axis current with a value.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Theory

Prior to normal motor operation a commissioning procedure is performed wherein accurate transient inductance values $L_\sigma$ are derived which correspond to different motor loads. The values $L_\sigma$ are correlated with load dependent motor parameters and stored in an inductance table in electronic memory. Later, during normal motor operation, the load dependent parameters are monitored and correlated with the inductance values $L_\sigma$, the values $L_\sigma$ provided to a motor controller and used thereby to adjust motor control.

Generally, during a commissioning procedure, an initial inductance estimate is chosen and the motor is driven at a specific and known load level. A feedback voltage which is indicative of inductance error is monitored and the inductance estimate is altered or tuned, as a function of the inductance error, thereby changing a command voltage until the inductance error is eliminated (i.e. until the feedback voltage is a desired value).

Once the inductance error is eliminated, the tuned inductance value is correlated with an instantaneous q-axis command current $i_{qe}^*$. Current $i_{qe}^*$ is indicative of the load and is a value provided during normal motor operation. The correlated values are stored in the inductance table for later use during normal motor operation.

Next, the motor is driven at a second specific and known load level while the transient inductance is tuned until inductance error is eliminated. Again, the tuned inductance is correlated with the instantaneous q-axis command current $i_{qe}^*$ and the correlated values are stored in the inductance table. Because current $i_{qe}^*$ is load dependent, the second current $i_{qe}^*$ associated with the second load should be different than the first current $i_{qe}^*$ associated with the first load.

The procedure described above is performed several additional times with different loads and the inductance table is populated with several different correlated values. After several correlated values are stored, a microprocessor can be used to interpolate between values to provide many more values in the inductance table.

After commissioning, during normal motor operation, as a motor operates at a specific load, a microprocessor identifies the instantaneous q-axis command current $i_{qe}^*$, accesses the table, correlates the identified current $i_{qe}^*$ with a transient inductance value L, and then uses the inductance value to facilitate truly field oriented motor control.

Figure 9:
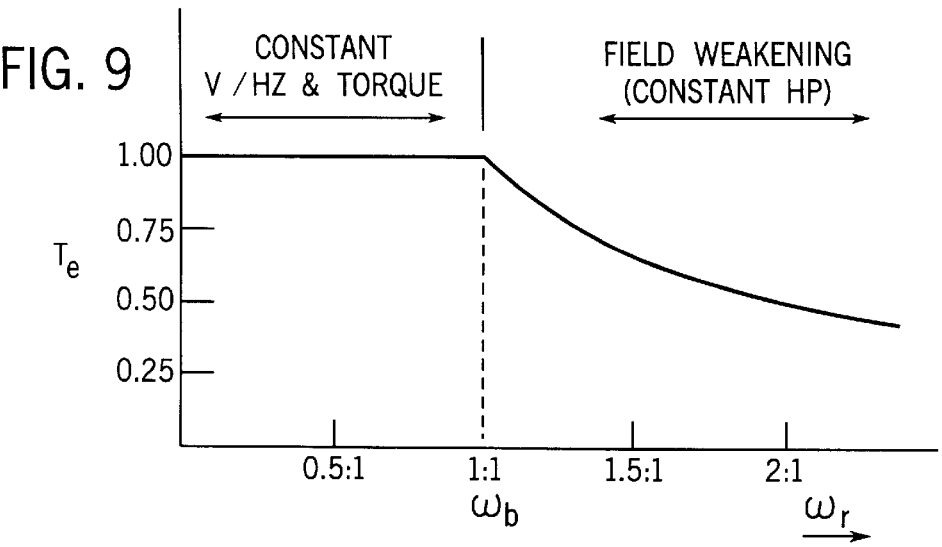
FIG. 9 is a graph showing operation of a motor in the constant torque and constant horsepower regions of operation.

According to the present invention, the inductance table is generated during motor operation in the constant torque or fixed field operating region. Induction motor operation is typically divided into two different operating regions. Referring to FIG. 9, a capability curve is illustrated wherein motor torque Te is plotted against rotor speed $\omega_r$.

The capability curve can be divided into two separate sections including speeds below a base speed $\omega_b$ and speeds thereabove. Below base speed $\omega_b$ commanded torque Te is provided by maintaining commanded current and commanded slip. Because the ratio of voltage to electrical speed $\omega_e$ is constant during operation in this region, the region is referred to as the fixed field region. In the fixed field region, both stator current and resulting flux remain constant.

Referring still to FIG. 9, at base speed $\omega_b$, the voltage component due to field current reaches a maximum value and cannot be safely increased further. Thus, to increase speed $\omega_r$ past base speed $\omega_b$, some other parameter must be changed. As well known in the motor arts, rotor speed $\omega_r$ can be further increased by reducing flux in inverse proportion to speed $\omega_r$ (hence operation above the rated speed is often referred to as field weaken). To reduce flux the field component of current is reduced. This region is also referred to as the constant horsepower operating region.

Referring again to Equations 1 and 2, during field weakening, because currents $i_{qe}$, $i_{de}$, fluxes $\lambda_{qe}$, $\lambda_{de}$ and speed $\omega_e$ are all controlled to facilitate FOC, it is difficult if not impossible to tune transient inductance during operation in the field weakening region. In other words, with many outputs which can change as a function of a variable input, it is difficult to isolate a transient inductance error.

However, during fixed field operation, a value indicative of inductance error can be isolated. To this end, note that during fixed field operation voltage $V_{qe}$ is supposed to be linearly related to speed $\omega_e$ (Equation 1). In a like manner, $V_{de}$ for a fixed load ($i_{qe}$=constant) should be linearly related to $\omega_e$ (Equation 2). An error develops in the feedback voltages $V_{qe}$ and $V_{de}$, as a result of an error in the estimate of $L_O$. This estimate error establishes an inaccurate value of the slip gain by the MRAC (62). This is also apparent from an examination of Equation 6. Assuming a correct resistance $r_s$ and fixed field operation ($i_{de}$ constant), an erroneous voltage $V_{de}$ is a result of an inaccurate value $L_O$. Simultaneously, an error occurs in the feedback voltage $V_{qe}$. This voltage error, however, persists even when the MRAC is active, thus zeroing the error $V_{de}$.

Thus, during the commissioning procedure, with an initial inductance estimate, the motor is driven in the fixed field operating region with a specific and constant load and command voltage $V_{qe}*$ is linearly altered as a function speed $\omega_e$. A feedback q-axis voltage $V_{qeF}$ is monitored and compared to command voltage $V_{qe}*$, the difference ($V_{qe}*-V_{qef}$) used as an inductance error indicator. D-axis command voltage $V_{de}*$ is determined according to Equation 6. The initial inductance estimate is tuned as a function of difference ($V_{qe}*-V_{qef}$) until the difference ($V_{qe}*-V_{qef}$) is zero. Once the difference ($V_{qu}*-V_{qef}$) is zero, the tuned inductance is correlated with the instantaneous q-axis command current $i_{qe}*$. The correlated values are stored in the inductance table. This procedure is followed several more times to derive different inductances for different loads and to thereby build the inductance table which is later used during normal motor operation to facilitate FOC.

B. Hardware

In the description that follows, an "e" subscript denotes that a signal is referred to the synchronous frame of reference, an "s" subscript denotes that a signal is referred to the stationary frame of reference, an "*" superscript denotes that a signal is a command signal, and an "F" subscript denotes a feedback signal.

While the following description details various blocks, steps, and functions, it should be remembered that all of these elements are meant to be implemented in software as computer programs and represent algorithms for execution by a conventional-type digital processor adapted for industrial applications, such as a model 8096 microelectronic processor as supplied by Intel Corporation of Santa Clara, Calif.

Figure 5:
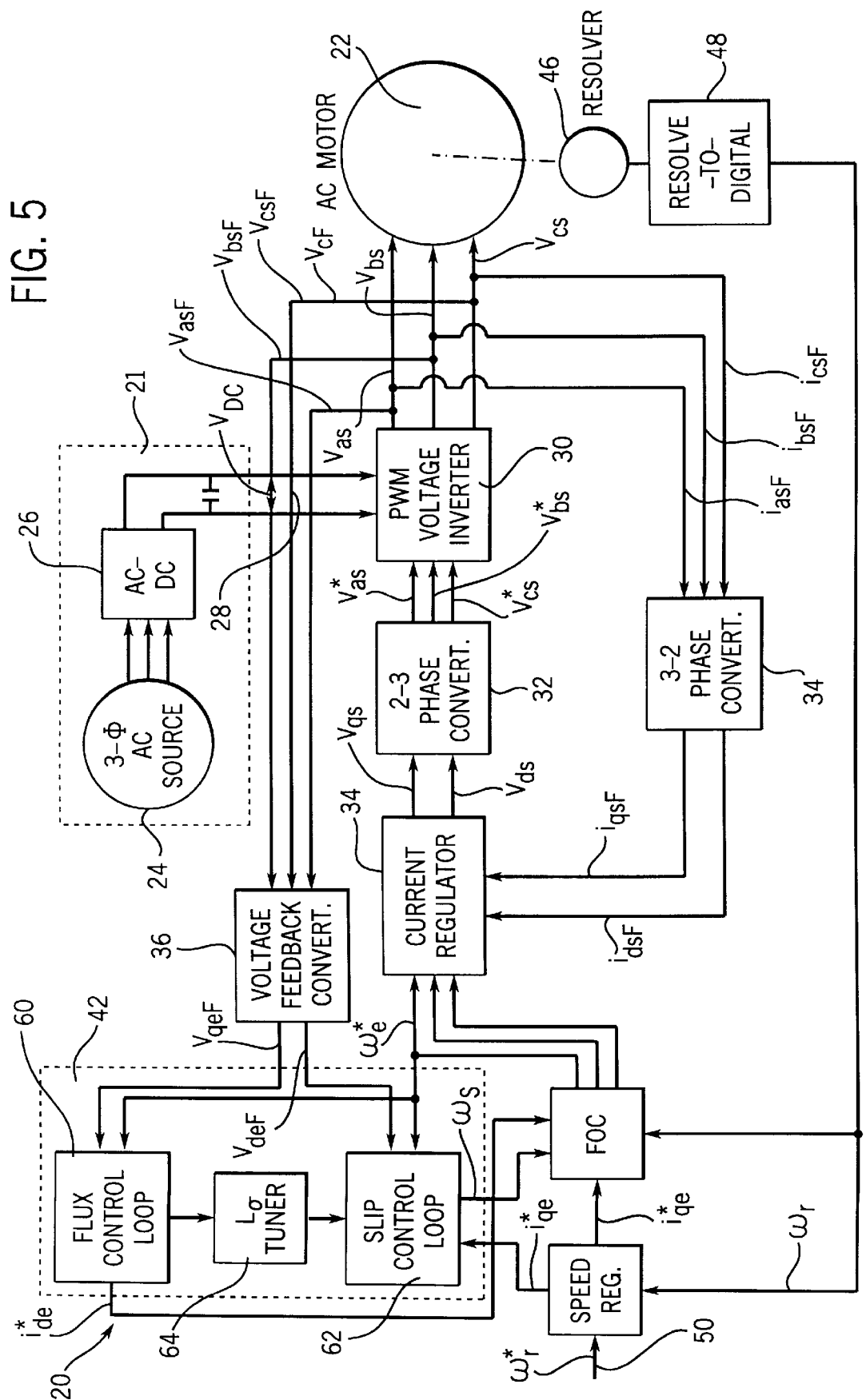
FIG. 5 provides an overall block diagram of the inventive control system.

Referring now to FIG. 5, therein is illustrated a current regulated pulse with modulated (CRPWM) motor control system 20 for an AC induction motor 22. The system 20 includes a power section 21, a slip identifier/controller 42, a voltage feedback converter 36, an FOC 44, a current regulator 34, a 2-to-3 phase converter 32, a 3-to-2 phase converter 34, a pulse width modulating (PWM) inverter 30, a resolver 46 and various other components which will be described below.

During motor 22 operation, various sensors are employed to monitor motor operation and provide feedback signals facilitating closed loop control. To this end, as motor 22 rotates, resolver 46 generates position signals which are provided to a resolver to digital converter 48 which determines actual rotor frequency from rotor position. Actual frequency $\omega_r$ is provided to a speed regulator 45 and to FOC 44.

In addition, stator winding currents $i_{asF}$, $i_{bsF}$ and $i_{csF}$ are sensed at motor 22 terminals using sensing devices of a type known in the art and provided to converter 34. Converter 34 is a 3-to-2 phase converter which converts these signals to two phase stationary feedback current signals $i_{qsF}$ and $i_{dsF}$ which are provided to regulator 34. Moreover, voltages indicative of stator voltages $V_{as}$, $V_{bs}$ and $V_{cs}$ are also sensed using sensors of a type known in the art, and are fed back as signals $V_{asF}$, $V_{bsF}$ and $V_{csF}$ to converter 36 and converted to synchronous values $V_{qeF}$ and $V_{deF}$.

Referring still to FIG. 5, power section 21 includes a three phase AC source 24, an AC-DC converter 26, and a DC bus 78. Source 24 provides power at a line frequency of 60 hertz. The three phases of source 24 are connected to converter 26 which rectifies the alternating current signals from the AC source 24 to produce a DC voltage ($V_{DC}$) on bus 28 that connects to power inputs of inverter 30. The AC source 24, AC-DC power converter 26 and bus 28 provide a DC source for generating a DC voltage of constant magnitude.

Inverter 30 includes a group of switching elements which are turned on and off to convert this DC voltage to pulses of constant magnitude which are supplied as signals $V_{as}$, $V_{bs}$ and $V_{cs}$ to the motor windings. Voltages $V_{as}$, $V_{bs}$ and $V_{cs}$ are phase voltage signals incorporated in the line to line voltage observed across the stator terminals. Each signal $V_{as}$, $V_{bs}$ and $V_{cs}$ is characterized by a first set of positive going pulses of constant magnitude but of varying pulse width followed by a second set of negative going pulses of constant magnitude and varying pulse width. The RMS value of each pulse train pattern approximates one cycle of a sinusoidal AC wave form. The pattern is repeated to generate additional cycles of the AC wave form.

Converter 32 provides control signals $V*_{as}$, $V*_{bs}$ and $V*_{cs}$ to the switching elements of inverter 30 to control the frequency and magnitude of the resultant AC power signals $V_{as}$, $V_{bs}$ and $V_{cs}$. Signals $V*_{as}$, $V*_{bs}$ and $V*_{cs}$ are balanced AC and vary in phase by 120°. The magnitude and frequency of signals $V*_{as}$, $V*_{bs}$ and $V*_{cs}$ determine the pulse widths and the number of pulses in pulse trains $V_{as}$, $V_{bs}$ and $V_{cs}$ which are applied to the terminals of motor 22.

Converter 32 provides control signals, $V*_{as}$, $V*_{bs}$ and $V*_{cs}$ by performing a 2-to-3 phase conversion on two phase input voltages $V_{qs}$ and $V_{ds}$. Two-to-3 phase conversions are well known in the art and therefore will not be explained here in detail. Input signals $V_{qs}$ and $V_{ds}$ to converter 32 are AC voltage command signals which are related to a stationary d-q reference frame.

Synchronous current regulator 34 receives feedback signals $i_{dsF}$ and $i_{qsF}$ in addition to a frequency command signal $\omega_e$ and stationary current command signals $i*_{qs}$ and $i*_{ds}$ and provides control signals $V_{qs}$ and $V_{ds}$ to converter 32. Details of regulator 34 have been previously shown and described in U.S. Pat. No. 4,680,695 which issued to Kerkman et al. on Jul. 14, 1987 and which is incorporated herein by reference. In summary, regulator 34 includes a proportional-integral loop (PI loop) with summing inputs. At one summing input, q-axis AC current command signal $i_{qs}*$ is algebraically summed with q-axis current feedback signal $i_{qsF}$ to provide a q-axis current error. At a second summing input, d-axis AC current command signal $i_{ds}*$ is algebraically summed with d-axis current feedback signal $i_{dsF}$ to provide a current error. The frequency command signal in per second $\omega_e*$ is provided to both the q-axis and d-axis branches. With these input signals, regulator 34 controls the command AC voltage signals $V_{qs}$ and $V_{ds}$ at its outputs in response to current errors, and further, it maintains the vector orientation of the output signals to the d-axis and the q-axis.

Figure 6:
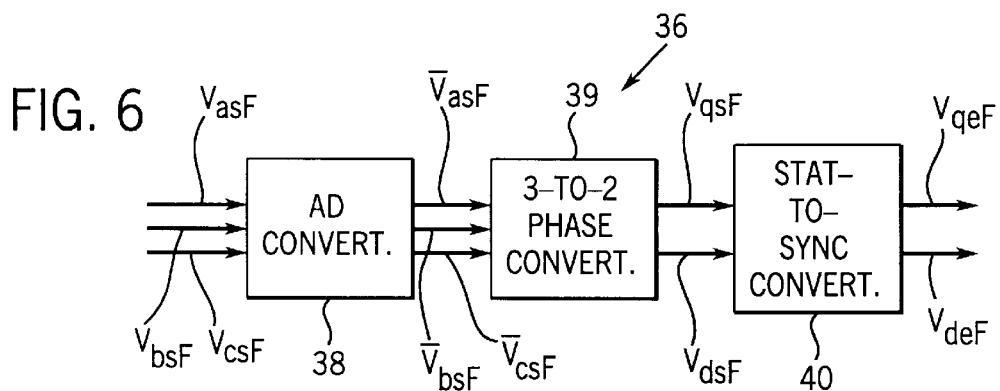
FIG. 6 is a block diagram of the voltage feedback converter of FIG. 5.

Referring also to FIG. 6, converter 36 includes three separate converters, an analog-to-digital converter 38, a 3-2 phase converter 39, and a stationary-to-synchronous converter 40. Converter 38 simply converts analog signals $V_{asF}$, $V_{bsF}$ and $V_{csF}$ to digital signals. Converter 39 converts three phase signals $\overline{V}_{asF}$, $\overline{V}_{bsF}$ and $\overline{V}_{csF}$ to two phase signals $V_{qsF}$ and $V_{dsF}$. Converter 40 converts signals $V_{dsp}$ and $V_{qsF}$ into signals that are synchronous with the stator voltage phasor producing synchronous voltage feedback signals $V_{deF}$, $V_{qeF}$ in a manner which is well known in the art.

Feedback signals $V_{qeF}$ and $V_{deF}$ are provided to slip identifier/controller 42, operation of which is described in more detail below. At this point, controller 42 also receives a synchronous q-axis current command signal $i_{qe}{}^*$ and frequency command signal $\omega_e{}^*$, and generates a synchronous d-axis current command signal $i_{de}{}^*$, and a slip frequency signal $\omega_s$ which are provided to FOC 44.

The basic functions of the FOC 44 are to respond to the speed feedback signal $\omega_r$ and the command frequency signal $\omega_r{}^*$ to control AC torque command $i_{qs}{}^*$, AC flux command $i_{ds}{}^*$ and the stator operating frequency $\omega_e{}^*$, all of which are provided to regulator 34.

Figure 7:
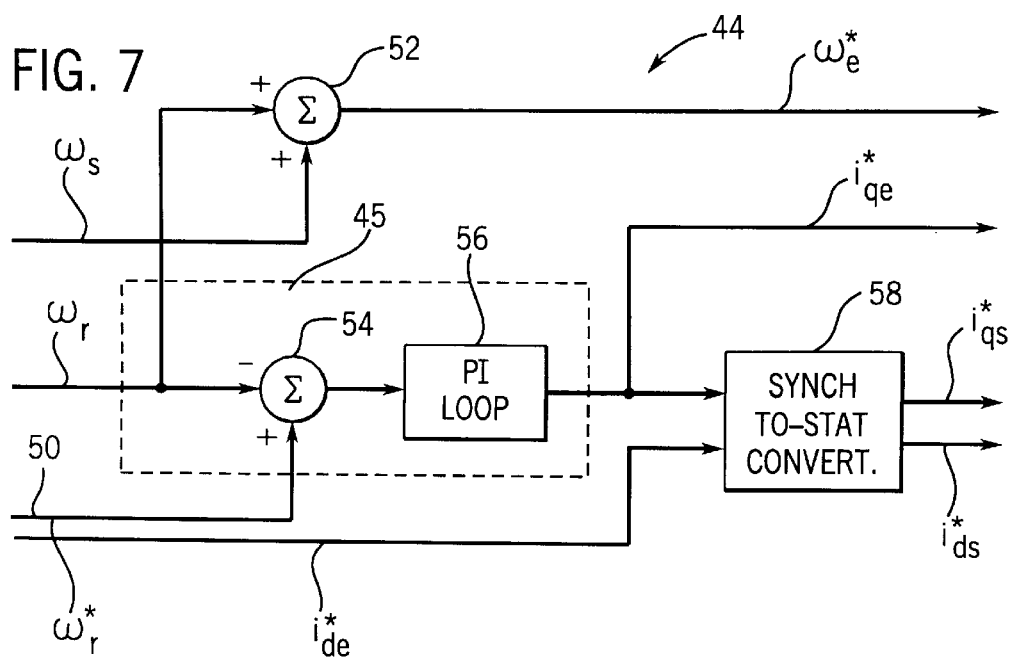
FIG. 7 is a block diagram of the speed controller of FIG. 5.

Referring also to FIG. 7, FOC 44 includes a first summer 52 and a synchronous to stationary converter 58, while speed regulator 45 includes a second summer 45 and a PI loop 56. Controller 44 receives rotor frequency command signal $\omega_r{}^*$ on line 50, rotor speed feedback signal $\omega_r$ and both synchronous d-axis current command signal $i_{de}{}^*$ and slip frequency signal $\omega_s$ from controller 42. Summer 52 receives and adds feedback signal $\omega_s$ and slip signal $\omega_e{}^*$, providing synchronous stator command frequency signal $\omega_e{}^*$. Summer 54 receives command signal $\omega_s{}^*$ and feedback signal $\omega_r$ and subtracts feedback signal $\omega_r$ from command signal $\omega_r{}^*$ providing an error signal to regulator 56 Regulator 56 is a simple PI controller. Regulator 56 outputs q-axis command current signal $i_{qe}{}^*$ Converter 58 receives both the q and d-axis current command signals $i_{qe}{}^*$ and $i_{de}{}^*$ and converts those signals to stationary q and d-axis command current signals $i_{qs}{}^*$ and $i_{ds}{}^*$. The transformation provided by converter 58 is well known in the art.

Figure 8:
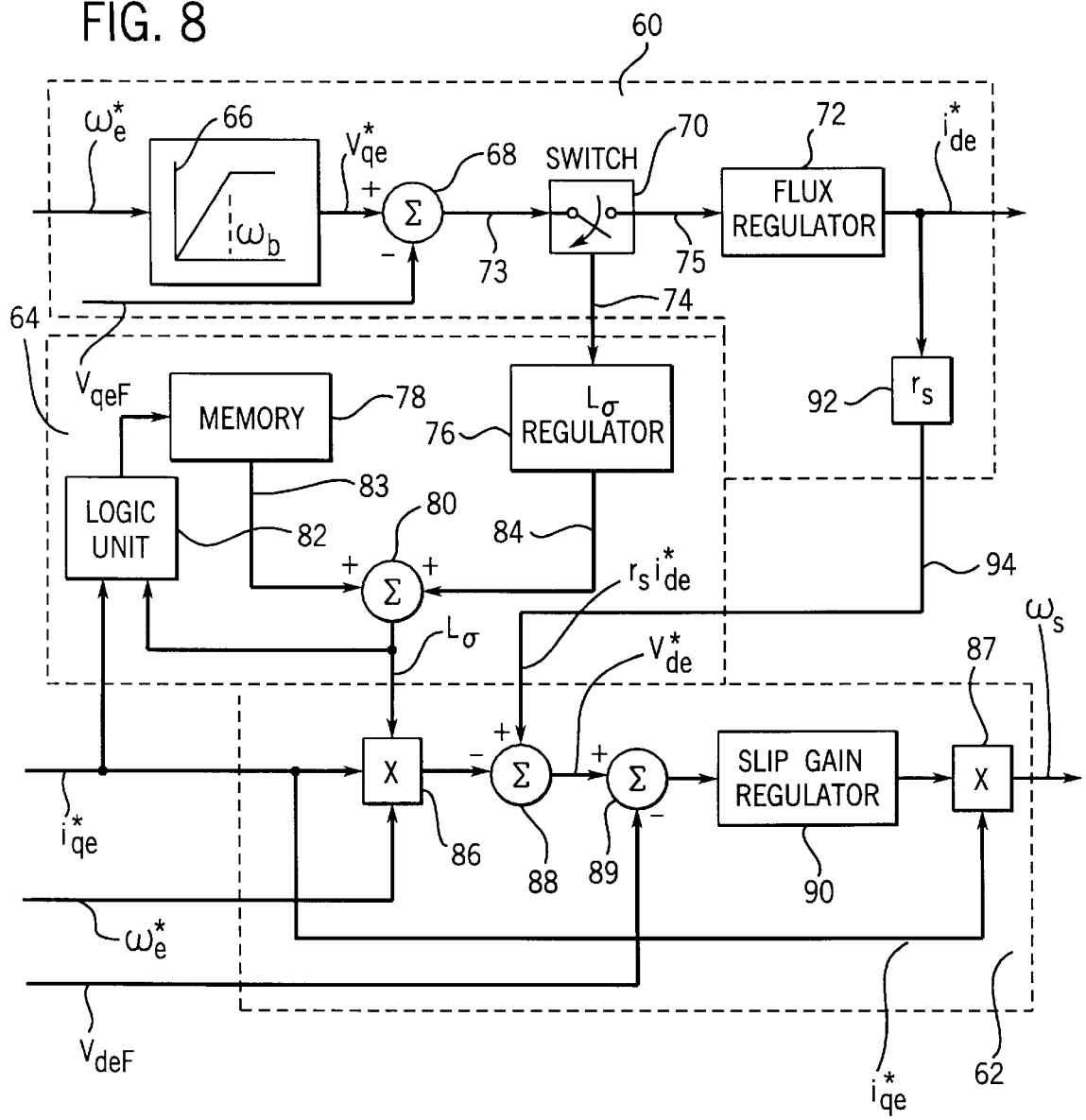
FIG. 8 is a block diagram of the slip identifier/controller of FIG. 5.

Referring again to FIG. 5, controller 42 includes a flux control loop 60, a slip control loop 62 and an $L_\sigma$ tuner 64. Referring also to FIG. 8, loop 60 includes a function block 66, a summer 68, a switch 70, a flux regulator 72 and a multiplier 92. Block 66 correlates an ideal synchronous q-axis voltage command signal $V_{qe}{}^*$ with frequency command signal $\omega_e{}^*$ according to Equation 1 above. Signal $V_{qe}{}^*$ is provided to summer 68 which subtracts feedback signal $V_{qeF}$ from signal $V_{qe}{}^*$ providing an error signal to switch 70 via line 73. Switch 70 is a single pole, double throw switch capable of connecting line 73 to either line 75, which is further connected to regulator 72, or to line 74, which is connected to tuner 64. Operation of tuner 64 is described below. Signals on line 75 are provided to flux regulator 72, a PI controller, which steps up the error signal and provides d-axis command signal $i_{de}{}^*$. Signal $i_{de}{}^*$ is multiplied by stator resistance $r_s$ at multiplier 92 and is then provided to loop 62.

Referring still to FIG. 8, tuner 64 includes an inductance regulator 76, a memory 78, a summer 80 and a logic unit 82. Regulator 76 is a PI controller. Thus, when regulator 76 receives an error signal via line 74, regulator 76 modifies the signal and provides an increased error signal on line 84.

Memory 78 serves two purposes. Initially, memory 78 includes an initial transient inductance estimate which, at the beginning of a commissioning process, is provided to summer 80 via line 83. In addition, memory 78 is used to build and store an $L_\sigma/i_{qe}$ table wherein accurate transient inductance estimates $L_\sigma$ are correlated with q-axis current $i_{qe}$ values. During a normal motor operation, the memory table is used to provide accurate transient inductance estimates for motor control. Logic unit 82 is used during a commissioning procedure to form the $L_\sigma/i_{qe}$ table and is then used during normal motor operation to provide accurate $L_\sigma$ estimates as a function of current $i_{qe}{}^*$. The commissioning procedure and normal motor operation are described below.

Slip loop 62 includes two multipliers 86, 87, two summers 88, 89 and a slip regulator 90. Multiplier 86 and summer 88 cooperate to calculate d-axis command voltage $V_{de}{}^*$ according to Equation 2 above. To this end, multiplier 86 receives q-axis command current signal $i_{qe}{}^*$, frequency command signal $\omega_e{}^*$ and transient inductance estimate $L_\sigma$ and multiplies those three inputs providing the second term on the right-hand side of Equation 2 (see also Equation 4). The first term on the right-hand side of Equation 2 is provided on line 94 via multiplier 92. Summer 88 receives input from both multipliers 86 and 92 and provides command signal $V_{de}{}^*$ to summer 89.

Summer 89 receives signal $V_{de}{}^*$ along with feedback signal $V_{deF}$ and subtracts signal $V_{deF}$ from command signal $V_{de}{}^*$, providing a d-axis error signal to regulator 90. Regulator 90 is a PI controller which corrects the slip gain for changes in rotor resistance (see U.S. Pat. No. 5,032,771). Multiplier 87 also receives q-axis command signal $i_{qe}{}^*$ and multiplies that signal by the increased error signal providing output slip frequency signal $\omega_s$.

C. Commissioning Procedure

The first step in the commissioning procedure is to provide an initial inductance estimate. This can be accomplished as described in a co-pending U.S. patent application which has Ser. No. 08/402,288 now U.S. Pat. No. 5,689,169, and is titled "TRANSIENT INDUCTANCE IDENTIFIER FOR MOTOR CONTROL," which was filed on Mar. 10, 1995 and is co-owned with the present application. That application is incorporated herein by reference. After an initial inductance estimate $L_\sigma$ has been provided, the initial estimate is stored in memory 78 (see, FIG. 8).

Referring again to FIGS. 5 and 8, the commissioning procedure continues as follows. After the initial transient inductance estimate has been derived, motor 22 is initialized to the nominal steady state flux associated with the fixed field region of operation. Then, the motor is driven so as to simulate different motor loads and derive transient inductance values for each load level.

To this end, the rotor frequency command signal $\omega_r{}^*$ on line 50 is changed in an accelerating yet controlled fashion which simulates a specific load level. During this time, feedback voltages $V_{qsF}$ and $V_{dsF}$ are provided via converter 36 to controller 42. In addition, field oriented controller 44 provides command signals $i_{qe}{}^*$ and $\omega_e{}^*$ to controller 42.

Memory 78 provides the initial inductance estimate via line 83 to summer 80, which in turn provides the initial estimate to multiplier 86. If the initial inductance estimate $L_\sigma$ is incorrect, the resulting slip frequency $\omega_s$ provided by loop 62 will be incorrect and the error will be reflected in the q-axis feedback voltage $V_{qeF}$ which will not be identical to the commanded voltage $V_{qe}{}^*$. In this case, when feedback voltage $V_{qeF}$ is subtracted from command voltage $V_{qe}{}^*$ an error will result on line 73.

When an error appears on line 73, switch 70 connects line 73 to line 74 and provides the error signal to regulator 76. Because regulator 76 is a PI controller, the error on line 74 is stepped up and provided to summer 80. Summer 80 adds the stepped-up error signal to the initial transient inductance estimate and provides an tuned inductance estimate to multiplier 86.

Eventually, the tuned inductance value provided to multiplier 86 reaches the actual transient inductance value. At this point, slip frequency $\int_s$ is correct and feedback voltage $V_{qeF}$ is identical to command voltage $V_{qe}^*$. Switch 70 is switched and connects line 73 to line 75. When switch 70 switches, microprocessor 82 correlates the instantaneous transient inductance value and the commanded q-axis current $i_{qe}^*$ and stores the two values in memory 78.

Continuing with the commissioning procedure, another controllable and known load level is chosen and is simulated by changing the rotor frequency command signal $\omega_r^*$ on line 50. As before, when the transient inductance estimate $L_o$ is incorrect, the error is reflected in the q-axis feedback voltage $V_{qeF}$ and an error results on line 73. Once again, when an error results on line 73, switch 70 connects line 73 to line 74, providing the error signal to regulator 76. Again, regulator 76 modifies the error signal and provides it to summer 80 which adds the initial inductance estimate $L_o$ to the modified error signal, providing a modified transient inductance value to multiplier 86. Eventually, the transient inductance value is adjusted so as to be equal to the actual inductance value, at which point the feedback voltage $V_{qeF}$ is identical to command voltage $V_{qe}^*$. Again, at that point, switch 70 connects line 73 to line 75 and microprocessor 82 correlates and stores both the q-axis command current $i_{qe}^*$ and the transient inductance value $L_o$ in memory 78.

After a plurality of different loads have been simulated by altering the rotor frequency command signal $\omega_r^*$, and current $i_{qe}^*$ and transient inductance values $L_o$ have been correlated and stored in memory 78, the inductance table is formed. The data in memory 78 is interpolated to provide additional correlated values. This concludes the commissioning procedure.

D. Normal Motor Operation

With the inductance table stored in memory 78, normal motor operation can begin. To this end, a rotor command frequency signal $\omega_r^*$ is provided at line 50 to drive motor 22. As motor 22 is driven, q-axis command current $i_{qe}^*$ is monitored by microprocessor 82. Microprocessor 82 accesses memory 78 and looks up a transient inductance value $L_o$ which is correlated with the instantaneous command current $i_{qe}^*$. The correlated inductance value $L_o$ is provided via line 83 to summer 80. During normal operation, regulator 76 does not provide a signal on line 84 and therefore the inductance estimate on line 83 is passed through summer 80 to multiplier 86. Then, slip control loop 62 uses the inductance estimate $L_o$ to provide slip frequency signal $\omega_s$. In this manner the correct and load dependent inductance values derived during the commissioning procedure are used during normal motor operation to achieve FOC.

Importantly, even though the inductance values in the inductance table where derived during fixed field motor operation, they can be used to facilitate FOC in either the fixed field or the field weakening regions of operation.

Although the present invention has been described above in the context of an apparatus, it should be understood that the present invention also contemplates a method to be used with the apparatus for determining and fine tuning transient inductance.

E. Simulated and Experimental Results

Figure 1:
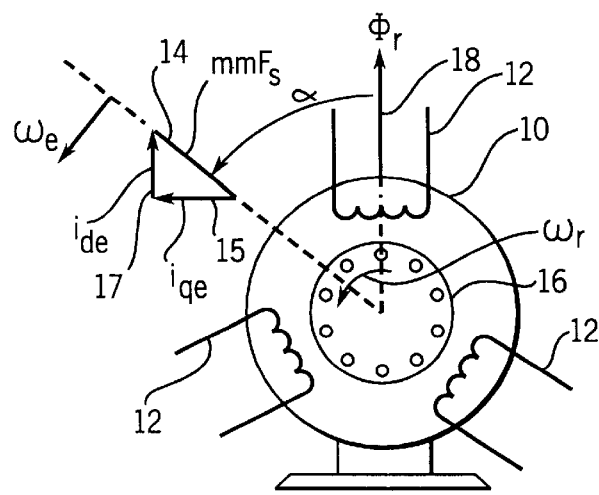
FIG. 1 is a schematic view in cross section of an induction motor showing instantaneous locations of the rotor flux, the stator mmf, and the torque and flux components of the stator mmf.
Figure 2:
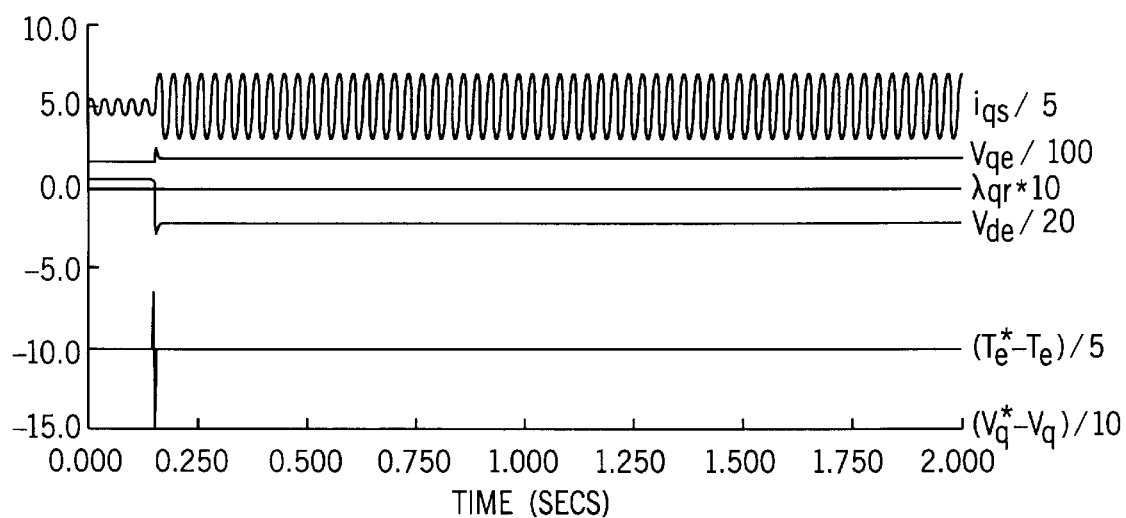
FIG. 2 is a graph illustrating various motor operating variables while the MRAC field oriented controller is operating with a correct transient inductance value.
Figure 3:
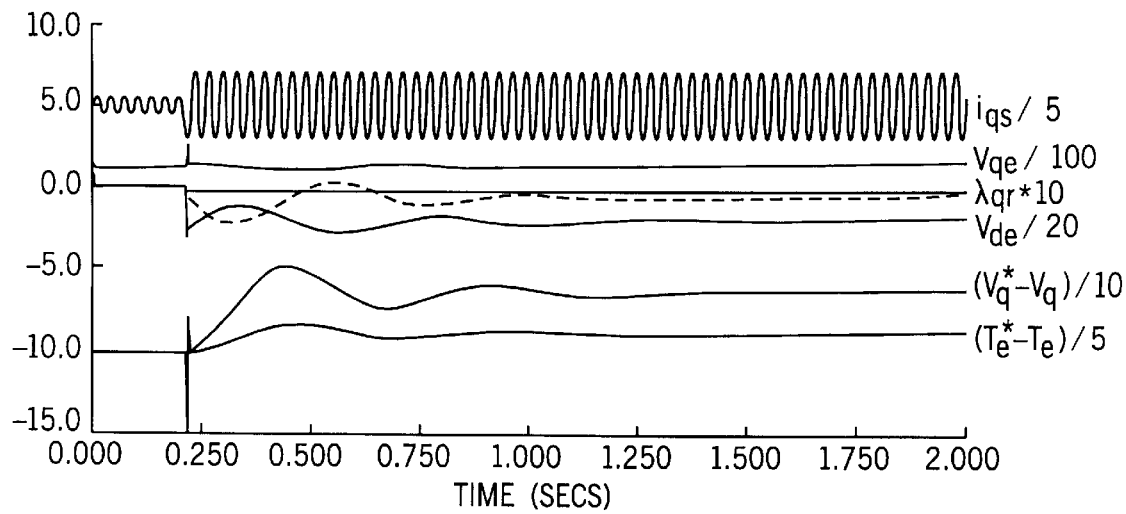
FIG. 3 is similar to FIG. 2, albeit with the transient inductance estimates set to 85% of the correct value.
Figure 10:
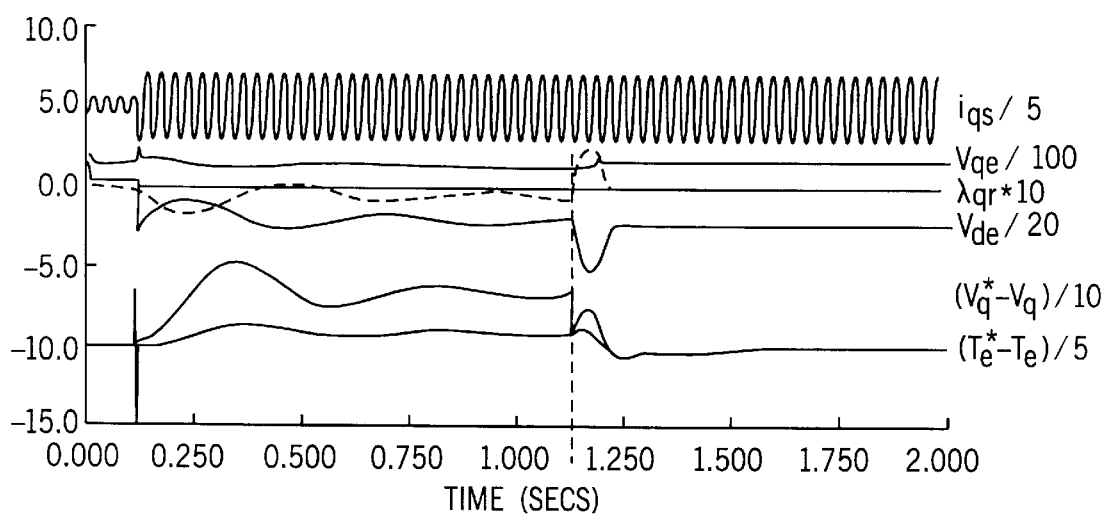
FIG. 10 is a graph similar to FIG. 3, albeit with the invention employed during only the last part of the period illustrated.

Simulated results similar to the results presented in FIG. 3 are shown in FIG. 10. Initially, a controller was operating at 900 rpm as a torque regulator at 1.0 p.u. torque reference. The inductance value $L_o$ was incorrect as evidenced by the torque error ($T_e^*-T_e$, non-zero rotor q-axis flux $\lambda_{qr}$, and oscillation in the q and d-axis stator voltages $V_{qe}$ and $V_{de}$. At approximately 1.1 seconds, the $L_o$ identifier was enabled. Immediately, the torque error and q-axis rotor flux become zero and the q and d-axis stator voltages $V_{qe}$ and $V_{de}$ stop oscillating.

Figure 11:
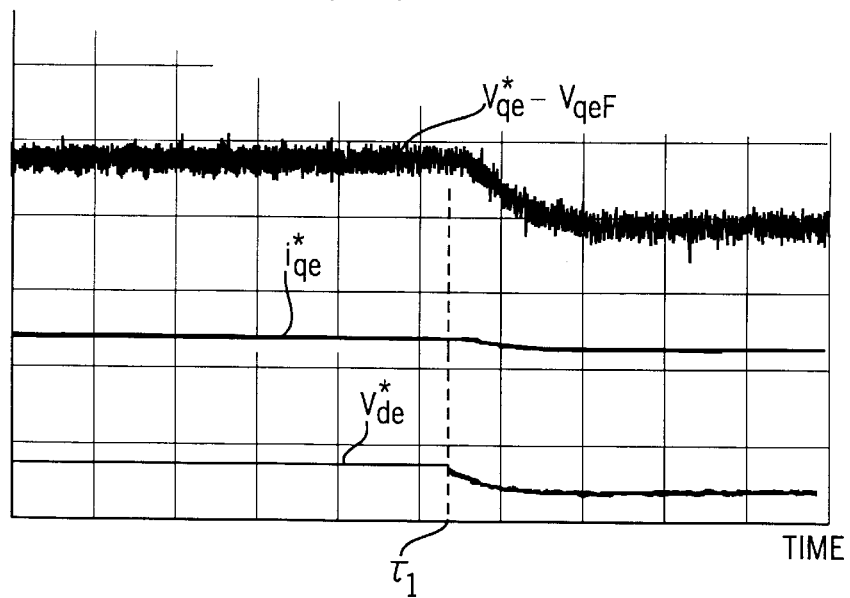
FIG. 11 is a graph illustrating motor parameters generated with and without the present invention.

FIG. 11 illustrates the effect of the present invention on motor operation. The results were obtained with a 75 HP motor operating at 900 rpm and approximately full load. A motor controller was operated as a velocity regulator with encoder feedback. FIG. 11 shows the ($V_{qe}^*-V_{qeF}$) difference, the d-axis command voltage $V_{de}^*$ before and after $L_o$ tuning and the torque producing command current $i_{qe}^*$. At time $T_1$, $L_o$ tuning is activated and the q-axis synchronous stator voltage error ($V_{qe}^*-V_{qeF}$) decays to zero, the d-axis command voltage $V_{de}^*$ decreases, and the torque producing current $i_{qe}^*$ decreases by 4% illustrating a higher torque per amp.

Figure 4:
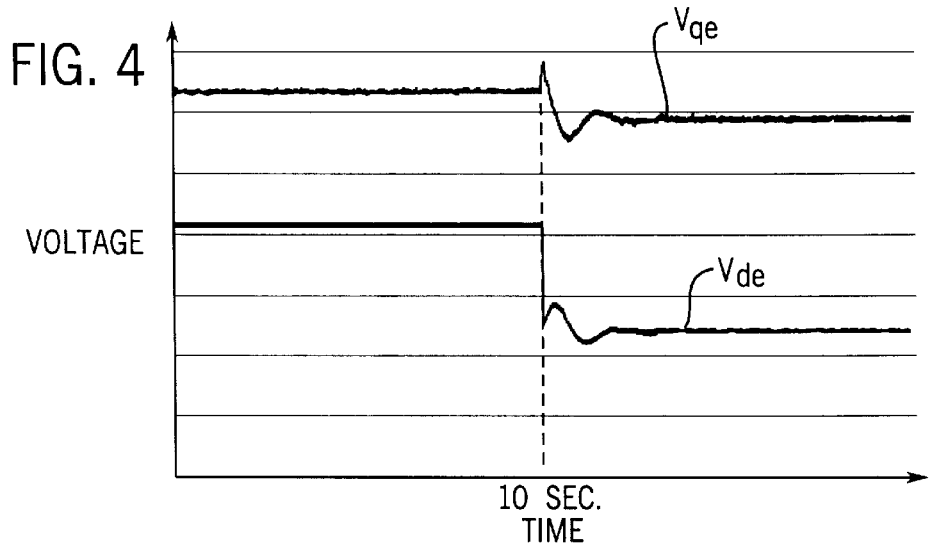
FIG. 4 is a graph illustrating motor terminal voltage responses to an applied torque step without inductance tuning.
Figure 12:
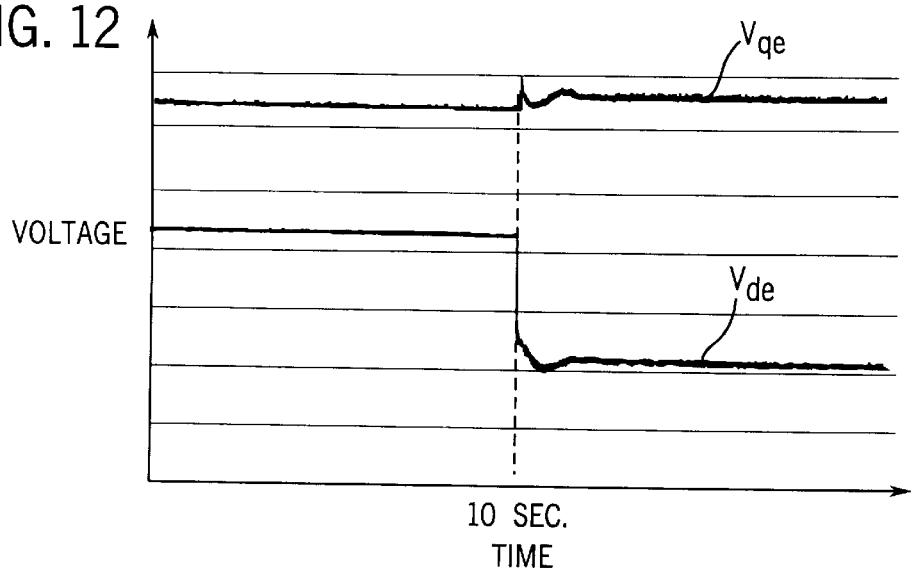
FIG. 12 is a graph similar to FIG. 4, albeit with the present invention employed.

Referring again to FIG. 4, when the $L_o$ value is incorrect, field orientation is not achieved and oscillations appear in the synchronous stator voltages $V_{de}$ and $V_{qe}$. FIG. 12 is a graph similar to FIG. 4 which illustrates similar data, albeit derived using the present invention to provide correct $L_o$ values. Clearly the transient response in FIG. 12 is less oscillatory than in FIG. 4. In addition, note the level of $V_{qe}$ rises slightly ($i_{qe}^* r_r$). $V_{de}$ becomes more negative as a result of the adaptive control maintaining the d-axis voltage to the new level commanded by the change in $L_o$.

It should also be noted that the methods and apparatuses described above are only exemplary and do not limit the scope of the invention, and that various modifications could be made by those skilled in the art that may fall under the scope of the invention. For example, while the method is described as being performed during a commissioning procedure, clearly, the method could be used in real time during motor operation to derive a suitable inductance table. To this end, during fixed field operation, as different loads occur, correlated values which have not already been provided could be provided and stored in the table. Once sufficiently close values have been stored, the microprocessor could interpolate therebetween to provide additional values. If the motor is operating in the field weakening operating region and inductance values have not yet been provided in the table for the specific operating point, the initial estimate could be used until suitable values are provided at a later time.

In addition, while the invention preferably yields many different inductance values corresponding to many different load levels, clearly the invention includes the case where only a small number (e.g. 5) of values are generated. Moreover, while the load is preferably simulated via motor acceleration, an actual controllable load could be used instead.

In order to apprise the public of the various embodiments that may fall within the scope of the invention, the following claims are made:

We claim:

1. An inductance identifier for use with a three phase field oriented motor controller which provides q-axis command and feedback voltage signals and an initial inductance estimate and uses an inductance value for motor control, the identifier comprising:

a comparator for comparing the command and feedback voltage signals to derive an error signal; and a calculator for mathematically combining the error signal and the initial inductance estimate to provide a correct inductance value for use by the controller.

2. The identifier of claim 1 wherein the calculator includes a regulator for increasing a magnitude of the error signal and a summer for mathematically combining the error signal and the initial inductance estimate.

3. The identifier of claim 2 wherein the regulator is a proportional-integral regulator.

4. The identifier of claim 3 wherein the summer mathematically combines by adding the error signal and the initial inductance estimate.

5. The identifier of claim 4 wherein the identifier operates during a commissioning procedure to identify the correct value.

6. The identifier of claim 5 wherein, during the commissioning procedure the motor is driven in the fixed field operating region while the correct value is derived.

7. An inductance identifier for use with a three-phase field orientated motor controller which provides small q-axis command and feedback voltage signals and a initial inductance estimate and uses an inductance value for motor control, the identifier comprising:
    a comparitor for comparing the command and feedback voltage signals to derive an error signal:
    a proportional-integral regulator for increasing a magnitude of the error signal; and
    a summer for adding error signal and the initial inductance estimate;
    wherein the identifier operates during normal motor operation and further includes a switch which, when the error signal is essentially zero, maintains a constant correct value.

8. The identifier of claim 7 wherein there are a plurality of correct values and each value is a function of motor load, the controller is capable of simulating different motor loads during the commissioning procedure by providing d and q-axis current command signals, the identifier includes a correlator for correlating correct values and the q-axis current command signal and a memory for storing the values as a function of the q-axis current command signal.

9. The identifier of claim 8 wherein the identifier further includes an inductance tuner which, during normal motor operation, receives the q-axis current command signal and generates a correct value by correlating the q-axis current with a value in the memory.

10. The identifier of claim 8 wherein, during the commissioning procedure, the controller simulates different loads by controlling motor acceleration.

11. A method for deriving an inductance estimate for use with a three phase field oriented motor controller which provides q-axis command and feedback voltage signals and an initial inductance estimate and uses an inductance value for motor control, the method comprising the steps of:
    comparing the command and feedback voltage signals to derive an error signal; and
    mathematically combining the error signal and the initial inductance estimate to provide a correct value for use by the controller.

12. The method of claim 11 wherein the step of combining further includes the steps of increasing a magnitude of the error signal and mathematically combining the increased error signal and the initial inductance estimate.

13. The method of claim 12 wherein the step of increasing includes the step of passing the error signal through a proportional-integral regulator.

14. The method of claim 13 wherein the step of mathematically combines includes adding the error signal and the initial inductance estimate.

15. The method of claim 14 wherein the method operates during normal motor operation and further includes the step of, when the error signal is essentially zero, maintaining a constant correct value.

16. The method of claim 14 wherein the method operates during a commissioning procedure.

17. A method for deriving an inductance estimate for use with a three-phase field oriented motor controller which provides q-axis command and feedback voltage signals and an initial inductance estimate and uses and inductance value for motor control, the method comprising the steps of:
    comparing the command and feedback voltage signals to derive an error signal:
    passing the error signal through a proportional-integral regulator to increase the error magnitude;
    adding the error signal and the initial inductance estimate to provide a corrected value for use by the controller;
    wherein the method operates during normal motor operation and further includes the step of, when the error signal is essentially zero, maintaining a constant correct value and, wherein there are a plurality of correct values corresponding to different motor loads and each value is a function of motor load, the controller is capable of simulating different motor loads during the commissioning procedure by providing d and q-axis current command signals and the method includes the steps of correlating correct values and the q-axis current command signal and storing each value as a function of the q-axis current command signal.

18. The method of claim 17 wherein the method further includes the step of, during normal motor operation, receiving the q-axis current command signal and generating a correct value by correlating the q-axis current with a value.

19. The method of claim 18 wherein, during the commissioning procedure, the controller simulates different loads by controlling motor acceleration.

20. A method for deriving a load dependent transient inductance table for use during normal motor operation for driving a three phase field oriented motor controller, the controller providing q-axis command and feedback voltage signals and an initial inductance estimate and including a memory, the controller using an inductance value for motor control, the inductance value being load dependent and the controller capable of simulating different loads during a commissioning procedure, the method comprising the steps of:
    (a) simulating a motor load by providing command signals to the motor;
    (b) comparing the command and feedback voltage signals to derive an error signal;
    (c) mathematically combining the error signal and the initial inductance estimate to provide a correct inductance value;
    (d) correlating the correct value with the instantaneous q-axis current command signal;
    (e) storing the correct value and q-axis current command signal in the memory;
    (f) changing the command signals to the motor to simulate a different load; and
    (g) repeating steps a through f until a plurality of correct values and q-axis current command signals have been correlated and stored in the memory.

21. The method of claim 20 wherein the step of simulating includes driving the motor at different acceleration rates.

22. The method of claim 20 the step of mathematically combining the error signal and the initial inductance estimate includes summing the signal and estimate.

23. The method of claim 20 also for providing a correct load dependent inductance value during normal motor operation, the method further including the steps of, during normal motor operation:

receiving the q-axis current command signal;

correlating the q-axis current with a q-axis value in the memory; and providing the inductance estimate which is related to the q-axis value in memory for use by the controller.

24. The method of claim 20 wherein, during the commissioning procedure the motor is driven in the fixed field operating region while the correct values are derived.

* * * * *